United States Patent
Handa et al.

(10) Patent No.: US 10,634,230 B2
(45) Date of Patent: Apr. 28, 2020

(54) STRAIN WAVE GEARING AND WAVE GENERATOR

(71) Applicant: Harmonic Drive Systems Inc., Shinagawa-ku, Tokyo (JP)

(72) Inventors: Jun Handa, Azumino (JP); Hiroaki Kimura, Azumino (JP); Sotaro Miyake, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 358 days.

(21) Appl. No.: 15/740,183

(22) PCT Filed: Jul. 7, 2015

(86) PCT No.: PCT/JP2015/069570
§ 371 (c)(1),
(2) Date: Dec. 27, 2017

(87) PCT Pub. No.: WO2017/006442
PCT Pub. Date: Jan. 12, 2017

(65) Prior Publication Data
US 2018/0187764 A1    Jul. 5, 2018

(51) Int. Cl.
*F16H 49/00*  (2006.01)
*F16C 19/16*  (2006.01)
*F16C 33/38*  (2006.01)

(52) U.S. Cl.
CPC .......... *F16H 49/001* (2013.01); *F16C 19/16* (2013.01); *F16C 33/38* (2013.01); *F16C 2361/61* (2013.01)

(58) Field of Classification Search
CPC ............................... F16H 49/001; F16C 19/16
See application file for complete search history.

(56) References Cited

U.S. PATENT DOCUMENTS

2007/0039414 A1 * 2/2007 Takemura ............. F16H 49/001
74/640
2009/0320643 A1 * 12/2009 Kanai ................... F16H 49/001
74/640

(Continued)

FOREIGN PATENT DOCUMENTS

JP          7-19239 A     1/1995
JP          8-4845 A      1/1996

(Continued)

OTHER PUBLICATIONS

International Search Report (PCT/ISA/210) dated Sep. 29, 2015, by the Japanese Patent Office as the International Searching Authority for International Application No. PCT/JP2015/069570.

(Continued)

*Primary Examiner* — Terence Boes
(74) *Attorney, Agent, or Firm* — Buchanan Ingersoll & Rooney PC

(57) ABSTRACT

A wave generator of a flat-type strain wave gearing has an insertion member disposed between two wave bearings. The insertion member is pressed into an elliptical outer peripheral surface of a plug and is fixed thereto by an adhesive. An inner ring contact part of the insertion member is in contact with inner rings of the wave bearings from the direction of a center axis. When the flat-type strain wave gearing is in an operating state, the wave bearings can be prevented from moving relative to the plug in the direction of the center axis by means of thrust force acting on the wave bearings.

10 Claims, 5 Drawing Sheets

(56) References Cited

U.S. PATENT DOCUMENTS

| | | | | |
|---|---|---|---|---|
| 2013/0247716 | A1* | 9/2013 | Takahashi | F16H 49/001 |
| | | | | 74/640 |
| 2014/0217855 | A1* | 8/2014 | Shibamoto | F16H 49/001 |
| | | | | 310/339 |
| 2015/0114174 | A1* | 4/2015 | Roopnarine | F16H 49/001 |
| | | | | 74/640 |
| 2016/0061308 | A1* | 3/2016 | Oishi | F16H 49/001 |
| | | | | 74/640 |
| 2016/0298746 | A1* | 10/2016 | Kiyono | F16H 49/001 |
| 2017/0175869 | A1* | 6/2017 | Kiyosawa | F16H 1/32 |
| 2018/0223729 | A1* | 8/2018 | Gilges | F02B 75/04 |
| 2018/0363750 | A1* | 12/2018 | Handa | F16H 49/001 |

FOREIGN PATENT DOCUMENTS

| | | |
|---|---|---|
| JP | 11-82641 A | 3/1999 |
| JP | 2011-110976 | 6/2011 |
| WO | WO 2015/075781 A1 | 5/2015 |

OTHER PUBLICATIONS

Written Opinion (PCT/ISA/237) dated Sep. 29, 2015, by the Japanese Patent Office as the International Searching Authority for International Application No. PCT/JP2015/069570.

"Product Information, FR Series Component," [online] Harmonic Drive Systems, Inc., [retrieved Apr. 9, 2015], internet URL:1436250763441_0.

* cited by examiner

STRAIN WAVE GEARING AND WAVE GENERATOR

TECHNICAL FIELD

The present invention relates to a wave generator of a strain wave gearing referred to as a flat type of gearing, and in particular to a wave generator provided with a plurality of, e.g., two wave bearings.

BACKGROUND ART

A flat strain wave gearing, as disclosed in Patent Document 1, is provided with two rigid internally toothed gears, one cylindrical flexible externally toothed gear, and one wave generator. The wave generator is provided with an ellipsoidally contoured rigid plug, and a wave bearing press-fitted onto the ellipsoidal external peripheral surface of the plug.

A movement-restricting mechanism that restricts movement of the wave generator in an axial direction is attached to the wave generator. The movement-restricting mechanism has members that protrude in the axial direction from the both sides of the plug of the wave generator, and the members are either supported by bearings or brought into contact with plates, the bearings or plates being disposed on both sides of the wave generator, whereby the plug of the wave generator is restricted from moving in the axial direction.

A known example of a wave generator of a flat strain wave gearing is one that is provided with two wave bearings, which is disclosed in Non-Patent Document 1. The two wave bearings are press-fitted onto the ellipsoidal external peripheral surface of the plug. The use of two wave bearings makes it possible for an externally toothed gear to reliably mesh with each of two internally toothed gears.

In the wave generator 100 disclosed in Non-Patent Document 1, two wave bearings 113, 114 are fixed by press-fitting to an external peripheral surface 112 of a plug 111, as shown in FIG. 5. A retainer restraint 124 is placed between these wave bearings 113, 114, and ball retainers 117, 121 are prevented from separating from both wave bearings 113, 114 in the axial direction. The retainer restraint 124 is a ring-shaped member having a center hole slightly larger than the external peripheral surface 112 of the plug 111, and the retainer restraint 124 faces the plug 111 and the two wave bearings 113, 114 with some clearance.

PRIOR ART LITERATURE

Patent Documents

Patent Document 1: JP 2011-110976 A

Non-Patent Documents

Non-Patent Document 1: "Product Information, FR Series Component," [online] Harmonic Drive Systems, Inc., [retrieved Apr. 9, 2015], internet URL:http://www.h-ds.co.jp/products/lineup/hd/01sr07_fr_2a/>

SUMMARY OF THE INVENTION

Problems to be Solved by the Invention

Wave generators having a structure in which two wave bearings are press-fitted onto the external peripheral surface of a plug, such as the wave generator disclosed in Non-Patent Document 1, present the following problems to be resolved.

In a strain wave gearing, mechanically speaking, thrust force acts on the wave generator. Depending on the operating state, thrust force acts in opposite directions as shown by arrows A and B in FIG. 5. When a strain wave gearing is operated under abnormally high torque, great thrust force acts on the wave bearings of the wave generator. When the thrust force is greater than the pressure-reliant fixing force on the plug, there is a risk that the wave bearings will move in the axial direction relative to the plug.

The movement of the wave bearings cannot be prevented even if the movement of the plug is restrained using the movement-restricting mechanism disclosed in Patent Document 1. Depending on the component layout in the device, there are also cases in which the movement-restricting mechanism cannot be placed in the spaces on both sides of the wave bearings.

Furthermore, there are cases in which the thrust force acting on the wave bearings acts in a direction of bringing the two wave bearings closer to each other. When the two wave bearings move in a direction of nearing each other due to the thrust force, both wave bearings are pushed from the axial direction with the retainer restraint therebetween. As a result, great sliding resistance acts on both the wave bearings, and there is a risk that smooth rotation of the wave bearings will be hindered.

An object of the present invention is to provide a wave generator that can prevent or minimize wave bearing movement due to thrust force, and a strain wave gearing provided with this wave generator.

Means of Solving the Problems

According to the present invention, there is provided a wave generator of a strain wave gearing, in which an externally toothed gear is made to flex into a non-circular shape and partially mesh with first and second internally toothed gears, and meshing positions between the externally toothed gear and the first and second internally toothed gears are moved in a circumferential direction, the wave generator being characterized by comprising:

a rigid plug;

a non-circular external peripheral surface formed on an external peripheral surface of the plug;

first and second wave bearings press-fitted on the non-circular external peripheral surface; and an insertion member;

the first and second wave bearings being disposed with a prescribed gap therebetween along a direction of a center axis of the plug;

the insertion member being disposed between the first and second wave bearings along the direction of the center axis;

the insertion member having an inner ring contact part and a retainer restraining part;

the inner ring contact part being in contact with respective inner rings of the first and second wave bearings from the direction of the center axis;

the retainer restraining part facing respective ball retainers of the first and second wave bearings from the direction of the center axis;

the inner ring contact part being either integrally formed in the plug or fixed to the external peripheral surface of the plug so as to not move in the direction of the center axis; and the retainer restraining part being either integrally formed in the inner ring contact part or fixed to the inner ring contact part so as to not move in the direction of the center axis.

When the strain wave gearing is operated under abnormally high torque, great thrust force acts on the adjacent first and second wave bearings.

Great thrust force acts on the first and second wave bearings in a direction of bringing the bearings closer together along the direction of the center axis. The respective inner rings of the first and second wave bearings come into contact from the direction of the center axis with the inner ring contact part of the insertion member fixed to the plug. Therefore, the first and second wave bearings do not move. Additionally, because the retainer restraining part of the insertion member is held in an appropriate position in the direction of the center axis in relation to the ball retainers of the first and second wave bearings, both ball retainers, which sandwich the retainer restraining part, will not come to be pushed in the direction of the axis.

Great thrust force sometimes acts on the first and second wave bearings in the same direction along the direction of the center axis. The thrust force acting on the first and second wave bearings is borne by the portions of the wave bearings press-fitted to the plug, and by the portion of the insertion member fixed to the plug. Consequently, movement of the first and second wave bearings in the direction in which thrust force acts can be prevented or minimized.

Here, there are cases in which great thrust force acts on the first and second wave bearings in a direction of separating the bearings from each other along the direction of the center axis. To inhibit movement of the first and second wave bearings in the direction of the axis, it is preferable to, e.g., attach inner ring restraining plates to end faces on the axial-directional sides of the plug, and to have these inner ring restraining plates come into contact with or face the inner rings of the first and second wave bearings from the direction of the axis.

Instead of including inner ring restraining plates, another possibility is to crimp the inner rings of the first and second wave bearings to the non-circular external peripheral surface of the plug to inhibit movement of the inner rings in the axial direction. Specifically, with the first and second wave bearings press-fitted to the non-circular external peripheral surface of the plug, the plug may be deformed through pressure being exerted thereon from both sides in the direction of the center axis, whereby the inner rings of the first and second wave bearings may be crimped to the non-circular external peripheral surface.

In the present invention, the inner ring contact part can be fixed to the external peripheral surface of the plug by being press-fitted to the external peripheral surface from the direction of the center axis. In this case, the retainer restraining part can be integrally formed in advance on the inner ring contact part. In other words, the inner ring contact part and the retainer restraining part can be manufactured as a single component, and can be fixed to the plug by press-fitting.

Additionally, the inner ring contact part can be formed integrally on the plug. In this case, a C-shaped stopper ring can be used as the retainer restraining part. The C-shaped stopper ring is fixed to the inner ring contact part by being fitted into an annular groove formed in the external peripheral surface of the inner ring contact part. When a C-shaped stopper ring is used as the retainer restraining part, the work of assembling the retainer restraining part on the inner ring contact part formed on the plug can be made simpler.

Next, the strain wave gearing of the present invention is characterized by comprising:

a rigid first internally toothed gear;

a rigid second internally toothed gear coaxially disposed adjacent to the first internally toothed gear;

a flexible externally toothed gear disposed coaxially on inner sides of the first and second internally toothed gears and capable of meshing with the first and second internally toothed gears; and a wave generator that causes the externally toothed gear to flex into a non-circular shape and partially mesh with the first and second internally toothed gears, and causes meshing positions between the externally toothed gear and the first and second internally toothed gears to move in a circumferential direction;

the wave generator having a rigid plug, a non-circular external peripheral surface formed on the external peripheral surface of the plug, first and second wave bearings press-fitted onto the non-circular external peripheral surface, and an insertion member;

the first and second wave bearings being coaxially disposed with a prescribed gap therebetween in the direction of the center axis of the plug;

the insertion member being disposed between the first and second wave bearings in the direction of the center axis;

the insertion member having an inner ring contact part and a retainer restraining part;

the inner ring contact part coming into contact with respective inner rings of the first and second wave bearings from the direction of the center axis;

the retainer restraining part facing respective ball retainers of the first and second wave bearings from the direction of the center axis;

the inner ring contact part being either integrally formed in the plug or fixed to the external peripheral surface of the plug so as to not move in the direction of the center axis; and the retainer restraining part being either integrally formed in the inner ring contact part or fixed to the inner ring contact part so as to not move in the direction of the center axis.

The inner ring contact part can be fixed to the external peripheral surface of the plug by being press-fitted to the external peripheral surface from the direction of the center axis. In this case, the retainer restraining part can be integrally formed in advance on the inner ring contact part.

The inner ring contact part can be integrally formed in advance on the plug. In this case, a C-shaped stopper ring can be used as the retainer restraining part. The C-shaped stopper ring can be fixed to the inner ring contact part by being fitted into an annular groove formed in the external peripheral surface of the inner ring contact part.

Additionally, it is preferable that the end faces on both center-axial-directional sides of the plug are provided with first and second inner ring restraining plates, the inner ring of the first wave bearing is sandwiched between the first inner ring restraining plate and the inner ring contact part, and the inner ring of the second wave bearing is sandwiched between the second inner ring restraining plate and the inner ring contact part.

Alternatively, the first and second wave bearings press-fitted to the non-circular external peripheral surface can be crimped to the non-circular external peripheral surface by exerting force on the plug from both center-axial-directional sides, and thereby deforming the plug.

MODE FOR CARRYING OUT THE INVENTION

An embodiment of a flat-type strain wave gearing to which the present invention is applied is described below with reference to the drawings.

Figure 1:
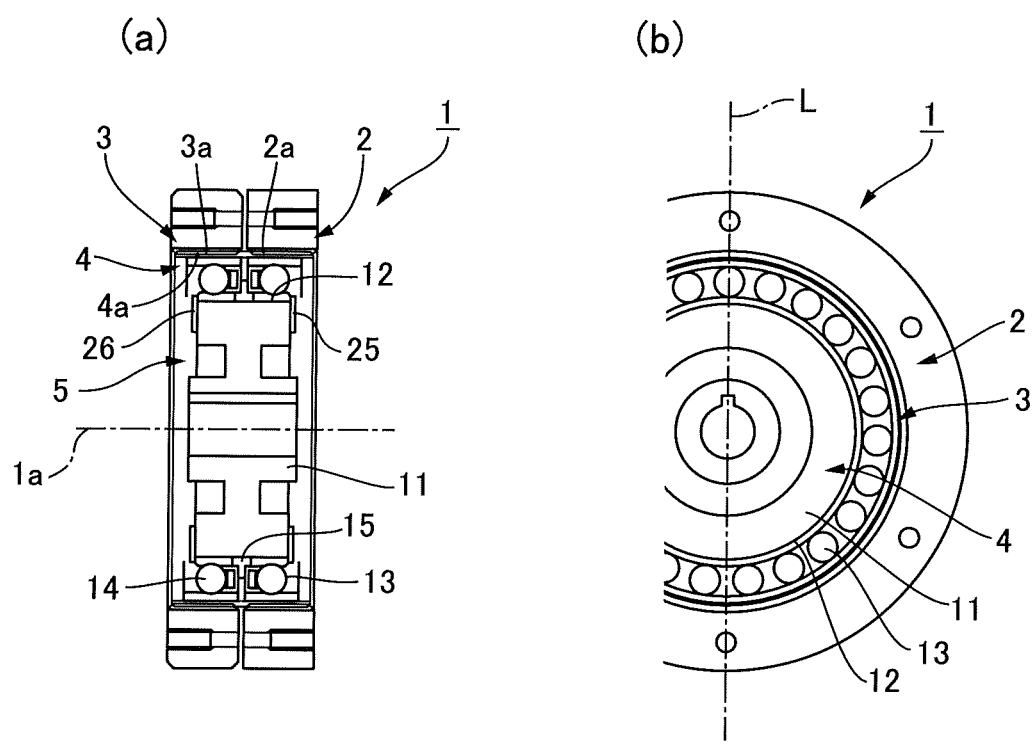
FIG. 1 includes a longitudinal cross-sectional view and a front view showing a flat strain wave gearing to which the present invention is applied.

FIG. 1(a) is a longitudinal cross-sectional view showing a flat strain wave gearing according to the present embodiment, and FIG. 1(b) is a front view of the same with part omitted. The flat-type strain wave gearing 1 is provided with a fixed-side internally toothed gear 2, an output-side internally toothed gear 3, a flexible externally toothed gear 4 having a cylindrical shape, and a wave generator 5.

The internally toothed gears 2 and 3 are coaxially aligned with a slight gap therebetween in the direction of the center axis 1a. The externally toothed gear 4 is coaxially placed on the inner sides of the internally toothed gears 2 and 3. The externally toothed gear 4 has a tooth width that includes the internally toothed gears 2 and 3. The portion of external teeth 4a of the externally toothed gear 4 on one side in the tooth width direction faces internal teeth 2a of the first internally toothed gear 2, and the portion of the external teeth 4a on the other side faces internal teeth 3a of the second internally toothed gear 3.

The wave generator 5 causes the externally toothed gear 4 to flex into a non-circular shape, which is an ellipsoidal shape in the present example, and to mesh with the internally toothed gears 2 and 3 at positions on a major axis L of the ellipsoidal shape. When the wave generator 5 rotates, the meshing positions between the externally toothed gear 4 and the internally toothed gears 2 and 3 move in a circumferential direction.

For example, the number of teeth of the output-side internally toothed gear 3 is 2n fewer than the number of teeth of the fixed-side internally toothed gear 2 (n being a positive integer). The internally toothed gear 3 and the externally toothed gear 4 have the same number of teeth. While the wave generator 5 makes one rotation, the externally toothed gear 4 rotates relative to the fixed-side internally toothed gear 2 by an angle corresponding to the difference in the number of teeth. The output-side internally toothed gear 3 rotates integrally with the externally toothed gear 4. The rotation of the internally toothed gear 3 is outputted toward a load member (not shown).

Figure 2:
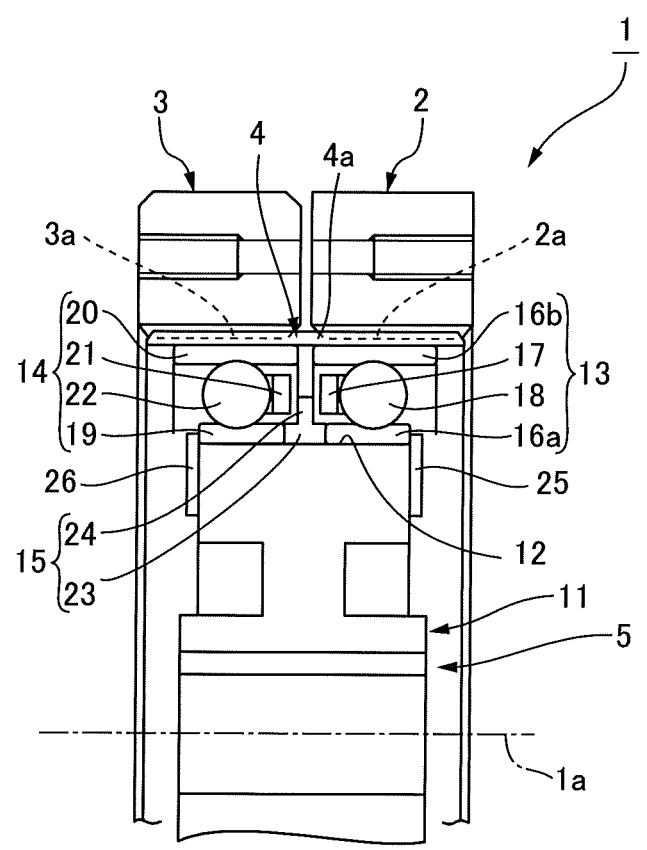
FIG. 2 is a partial enlarged cross-sectional view of the flat strain wave gearing of FIG. 1.

FIG. 2 is a partial enlarged cross-sectional view of the flat-type strain wave gearing 1. The following description is made with reference to FIGS. 1 and 2. The wave generator 5 is provided with a rigid plug 11, an ellipsoidal external peripheral surface 12 formed on the external peripheral surface of the plug 11, first and second wave bearings 13 and 14 bonded and fixed to the ellipsoidal external peripheral surface 12 by press-fitting from the direction of the center axis 1a, and a ring-shaped insertion member 15 placed between these wave bearings.

The first and second wave bearings 13, 14 are coaxially aligned on the ellipsoidal external peripheral surface 12, with a slight gap left therebetween along the direction of the center axis 1a. The first wave bearing 13 is provided with an inner ring 16a, an outer ring 16b, a ball retainer 17 placed between these rings, and a plurality of balls 18 that are held by the ball retainer 17 so as to be free to roll and arranged in the circumferential direction with fixed gaps. The second wave bearing 14, having the same structure, is provided with an inner ring 19, an outer ring 20, a ball retainer 21, and balls 22.

The insertion member 15 is positioned between the first and second wave bearings 13 and 14 along the direction of the center axis 1a. The insertion member 15 has a symmetrical cross-sectional shape along the direction of the center axis 1a, and the insertion member 15 is provided with a wide ring-shaped inner ring contact part 23 formed on the inner periphery of the insertion member 15, a narrow ring-shaped retainer restraining part 24 formed integrally on the outer periphery of the insertion member 15. Disc-shaped inner ring restraining plates 25 and 26 fixed to the outer peripheral portions of the end faces on both sides of the plug 11 are provided.

The annular end faces on both sides of the inner ring contact part 23 of the insertion member 15 along the direction of the center axis 1a are in contact with, respectively, the annular end faces of the inner rings 16a and 19 of the first and second wave bearings 13 and 14. The annular end faces on both sides of the retainer restraining part 24 of the insertion member 15 along the direction of the center axis 1a respectively face the annular end faces of the ball retainers 17 and 21 of the first and second wave bearings 13 and 14 with a slight gap in between.

In the present example, the inner ring contact part 23 of the insertion member 15 is press-fitted from the direction of the center axis 1a to the ellipsoidal external peripheral surface 12 of the plug 11, and is fixed thereto by an adhesive. The insertion member 15 is thereby fixed to the ellipsoidal external peripheral surface 12 of the plug 11 so as to not move in the direction of the center axis 1a.

The external peripheral edge portion of the inner ring restraining plate 25 attached to the plug 11 protrudes slightly outward in the radial direction from the ellipsoidal external peripheral surface 12 of the plug 11, and faces the annular end face of the inner ring 16a of the first wave bearing 13. The inner ring 16a is thereby sandwiched along the direction of the center axis 1a between the inner ring contact part 23 of the insertion member 15 and the external peripheral edge portion of the first inner ring restraining plate 25. Similarly, the external peripheral edge portion of the other inner ring restraining plate 26 faces the annular end face of the inner ring 19 of the second wave bearing 14. The inner ring 19 is thereby sandwiched between the inner ring contact part 23 of the insertion member 15 and the external peripheral edge portion of the inner ring restraining plate 26.

When the flat-type strain wave gearing 1 is in an operating state, thrust force acts on the first and second wave bearings 13 and 14. When thrust force acts in a direction of bringing the first and second wave bearings 13 and 14 closer together, the inner ring contact part 23 of the insertion member 15 positioned therebetween functions as a spacer, and the first and second wave bearings 13 and 14 are prevented from moving in the direction of the center axis 1a.

When thrust force acts in the same direction on the first and second wave bearings 13 and 14, the thrust force is borne by the press-fitted fixed portions of the first and second wave bearings 13 and 14, and the press-fitted fixed portion of the insertion member 15. Consequently, movement of the first and second wave bearings 13 and 14 in the direction of the center axis 1a is prevented or minimized.

When thrust force acts in a direction of separating the first and second wave bearings 13 and 14 from each other, the movements of the bearings along the center axis 1a are inhibited by the inner ring restraining plates 25 and 26 positioned on the sides of the bearings. Thus, the first and second wave bearings 13 and 14 can be reliably prevented from moving from the plug 11 in the direction of the center axis 1a.

(Another Example of Wave Generator)

In this example, the inner ring contact part 23 of the insertion member 15 is fixed to the plug 11 by press-fitting and an adhesive. As an alternative, the inner ring contact part 23 of the insertion member 15 can be integrally formed in the plug 11.

Figure 3:
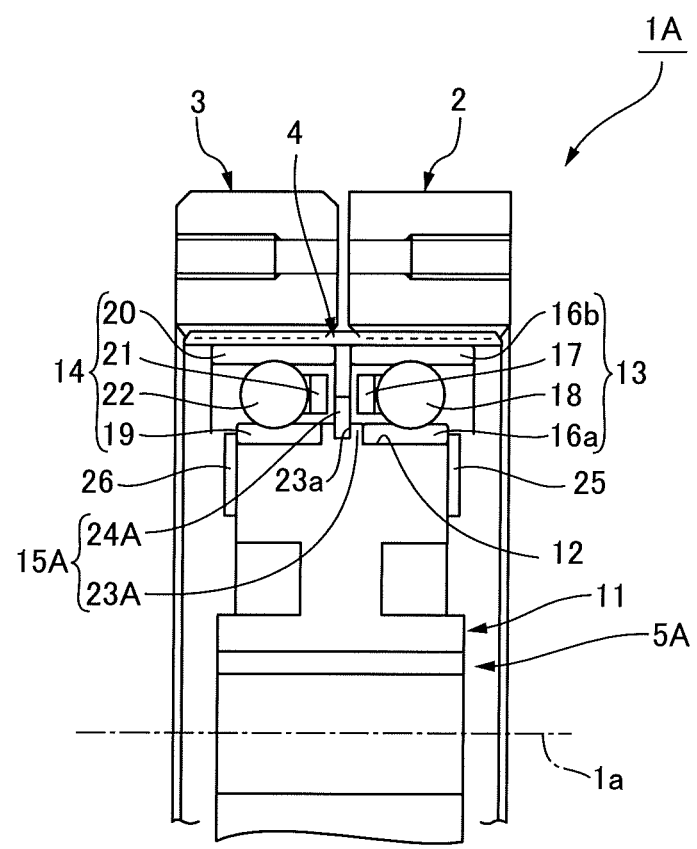
FIG. 3 is a partial enlarged cross-sectional view showing another example of the wave generator of FIG. 1.

FIG. 3 is a partial enlarged cross-sectional view showing a wave generator in which an inner ring contact part of an insertion member 15 is integrally formed in a plug. Because the basic configuration of the wave generator 5A shown in this drawing is the same as that of the wave generator 5 described above, the insertion member 15A is described below.

The insertion member 15A is provided with an inner ring contact part 23A and a retainer restraining part 24A. The inner ring contact part 23A is an annular protrusion of a fixed thickness and fixed width that protrudes outward in the radial direction from the ellipsoidal external peripheral surface of the plug 11. The retainer restraining part 24A is a C-shaped stopper ring. The C-shaped stopper ring is fitted into an annular groove 23a formed in the circular external peripheral surface of the inner ring contact part 23A, and is thereby fixed to the inner ring contact part 23A so as to not move in the direction of the center axis 1a.

A flat-type strain wave gearing 1A, in which the wave generator 5A provided with the insertion member 15A is used, yields operative effects similar to those of the flat-type strain wave gearing 1 described above. Because the C-shaped stopper ring is fitted into the groove 23a, the work of assembling the insertion member 15A is easier than if the insertion member 15A were to be press-fitted onto the ellipsoidal external peripheral surface of the plug 11.

Next, in the wave generators 5, 5A described above, movement of the first and second wave bearings 13 and 14 due to thrust force acting in a direction of separating the bearings from each other is inhibited using the pair of inner ring restraining plates 25 and 26. Instead of arranging the inner ring restraining plates 25 and 26, the mechanism for inhibiting this movement can be a mechanism that crimps the inner rings 16a and 19 of the first and second wave bearings 13 and 14 to the ellipsoidal external peripheral surface 12 of the plug 11.

Figure 4:
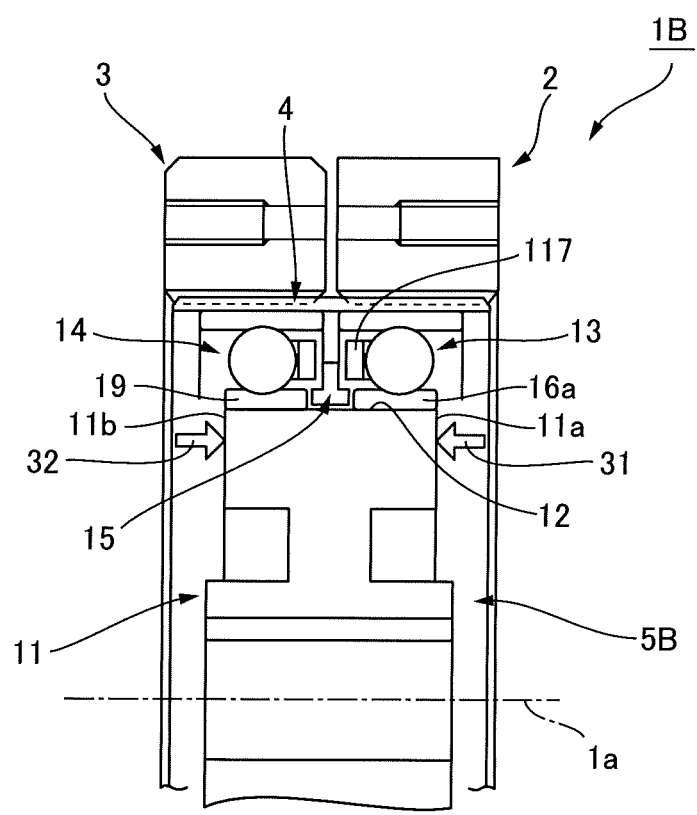
FIG. 4 is a partial enlarged cross-sectional view showing yet another example of the wave generator of FIG. 1.
Figure 5:
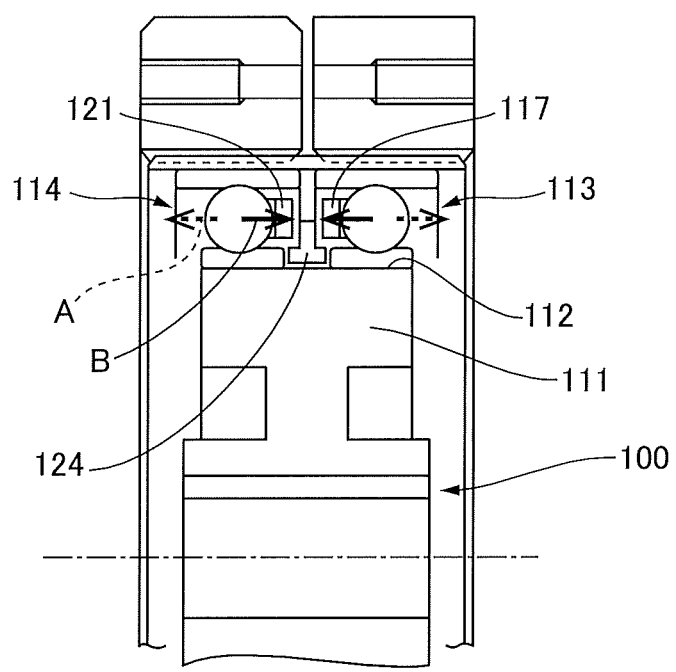
FIG. 5 is a partial enlarged cross-sectional view showing a flat strain wave gearing.

The specific method involves using a punch or another tool to make dents from the direction of the center axis 1a in the external peripheral edge portions of the end faces 11a, 11b on both sides of the plug 11, deforming the portions on both sides of the ellipsoidal external peripheral surface 12 of the plug 11, and crimping the inner rings 16a and 19 to the ellipsoidal external peripheral surface 12, as shown by arrows 31 and 32 in FIG. 4. The dents may be made at multiple locations at equal intervals along the circumferential direction in the outer peripheral portions of the end faces 11a and 11b. A strain wave gearing 1B provided with a wave generator 5B configured in this manner also yields operative effects similar to those yields when the wave generators 5 and 5A described above are used.

In the examples described above, the plug of the wave generator is provided with an ellipsoidal external peripheral surface, and the externally toothed gear is made to flex into an ellipsoidal shape and mesh with the internally toothed gears in two locations. Another possibility is that the plug of the wave generator causes the externally toothed gear to flex into a three-lobed shape and mesh with the internally toothed gears in three locations along the circumferential direction. In this case, the difference in the number of teeth between the fixed-side internally toothed gear and the externally toothed gear is set to be 3n (n being a positive integer).

The invention claimed is:

1. A wave generator of a strain wave gearing, in which the wave generator causes an externally toothed gear to flex into a non-circular shape and partially mesh with first and second internally toothed gears, and causes meshing positions between the externally toothed gear and the first and second internally toothed gears to move in a circumferential direction, the wave generator comprising:
   a rigid plug;
   a non-circular external peripheral surface formed on an external peripheral surface of the plug;
   first and second wave bearings press-fitted on the non-circular external peripheral surface; and
   an insertion member;
   the first and second wave bearings being disposed with a prescribed gap therebetween along a direction of a center axis of the plug;
   the insertion member being disposed between the first and second wave bearings along the direction of the center axis;
   the insertion member having an inner ring contact part and a retainer restraining part;
   the inner ring contact part being in contact with respective inner rings of the first and second wave bearings from the direction of the center axis;
   the retainer restraining part facing respective ball retainers of the first and second wave bearings from the direction of the center axis;
   the inner ring contact part being either integrally formed in the plug or fixed to the external peripheral surface of the plug so as to not move in the direction of the center axis; and
   the retainer restraining part being either integrally formed in the inner ring contact part or fixed to the inner ring contact part so as to not move in the direction of the center axis.

2. The wave generator of the strain wave gearing according to claim 1,
   wherein the inner ring contact part is fixed to the external peripheral surface of the plug by being press-fitted to the external peripheral surface from the direction of the center axis, and
   the retainer restraining part is integrally formed on the inner ring contact part.

3. The wave generator of the strain wave gearing according to claim 1,
   wherein the inner ring contact part is formed integrally on the plug,
   the retainer restraining part is a C-shaped stopper ring, and
   the C-shaped stopper ring is fixed to the inner ring contact part by being fitted into an annular groove formed in an external peripheral surface of the inner ring contact part.

4. The wave generator of the strain wave gearing according to claim 1, further comprising:
   first and second inner ring restraining plates respectively attached to end faces on both axial-directional sides of the plug, wherein the inner ring of the first wave bearing is sandwiched between the first inner ring restraining plate and the inner ring contact part, and the inner ring of the second wave bearing is sandwiched between the second inner ring restraining plate and the inner ring contact part.

5. The wave generator of the strain wave gearing according to claim 1, wherein the first and second wave bearings are crimped to the non-circular external peripheral surface by deforming the plug through pressure being exerted thereon from both sides in the direction of the center axis.

6. A strain wave gearing comprising:

a rigid first internally toothed gear;

a rigid second internally toothed gear coaxially disposed adjacent to the first internally toothed gear;

a flexible externally toothed gear disposed coaxially on inner sides of the first and second internally toothed gears and capable of meshing with the first and second internally toothed gears; and a wave generator that causes the externally toothed gear to flex into a non-circular shape and partially mesh with the first and second internally toothed gears, and causes meshing positions between the externally toothed gear and the first and second internally toothed gears to move in a circumferential direction;

the wave generator having a rigid plug, a non-circular external peripheral surface formed on the external peripheral surface of the plug, first and second wave bearings press-fitted onto the non-circular external peripheral surface, and an insertion member;

the first and second wave bearings being coaxially disposed with a prescribed gap therebetween in the direction of the center axis of the plug;

the insertion member being disposed between the first and second wave bearings in the direction of the center axis;

the insertion member having an inner ring contact part and a retainer restraining part;

the inner ring contact part being in contact with respective inner rings of the first and second wave bearings from the direction of the center axis;

the retainer restraining part facing respective ball retainers of the first and second wave bearings from the direction of the center axis;

the inner ring contact part being either integrally formed in the plug or fixed to the external peripheral surface of the plug so as to not move in the direction of the center axis; and the retainer restraining part being either integrally formed in the inner ring contact part or fixed to the inner ring contact part so as to not move in the direction of the center axis.

7. The strain wave gearing according to claim 6, wherein the inner ring contact part is fixed to the external peripheral surface of the plug by being press-fitted to the external peripheral surface from the direction of the center axis, and the retainer restraining part is integrally formed on the inner ring contact part.

8. The strain wave gearing according to claim 6, wherein the inner ring contact part is integrally formed on the plug, the retainer restraining part is a C-shaped stopper ring, and the C-shaped stopper ring is fixed to the inner ring contact part by being fitted into an annular groove formed in an external peripheral surface of the inner ring contact part.

9. The strain wave gearing according to claim 6, further comprising:

first and second inner ring restraining plates respectively attached to end faces on both axial-directional sides of the plug, wherein the inner ring of the first wave bearing is sandwiched between the first inner ring restraining plate and the inner ring contact part, and the inner ring of the second wave bearing is sandwiched between the second inner ring restraining plate and the inner ring contact part.

10. The strain wave gearing according to claim 6, wherein the first and second wave bearings are crimped to the non-circular external peripheral surface by deforming the plug through pressure being exerted thereon from both sides in the direction of the center axis.

* * * * *